United States Patent
Kozee et al.

(10) Patent No.: US 8,544,990 B2
(45) Date of Patent: Oct. 1, 2013

(54) PIGMENTED INK JET INK COMPOSITION

(75) Inventors: Michael Kozee, Wheaton, IL (US);
Fengfei Xiao, Northbrook, IL (US);
Linfang Zhu, Woodridge, IL (US);
Jeffrey Pierce, Aurora, IL (US)

(73) Assignee: Videojet Technologies Inc., Wood Dale, IL (US)

(*) Notice: Subject to any disclaimer, the term of this patent is extended or adjusted under 35 U.S.C. 154(b) by 171 days.

(21) Appl. No.: 13/193,794

(22) Filed: Jul. 29, 2011

(65) Prior Publication Data
US 2013/0027478 A1    Jan. 31, 2013

(51) Int. Cl.
*B41J 2/02* (2006.01)
(52) U.S. Cl.
USPC .......................................... 347/73
(58) Field of Classification Search
USPC .............................. 347/73–82, 90
See application file for complete search history.

(56) References Cited

U.S. PATENT DOCUMENTS

| | | | |
|---|---|---|---|
| 6,203,605 B1 | 3/2001 | Thakkar | |
| 6,328,393 B1 * | 12/2001 | Lin et al. | 347/73 |
| 6,364,469 B1 * | 4/2002 | Yang et al. | 347/77 |
| 6,565,202 B2 | 5/2003 | Rose | |
| 6,958,090 B2 | 10/2005 | Redfearn | |
| 6,997,979 B2 | 2/2006 | Bauer | |
| 7,294,186 B2 | 11/2007 | Bauer | |
| 7,384,465 B2 | 6/2008 | Jackson | |
| 7,476,271 B2 | 1/2009 | Doumaux | |
| 2009/0033728 A1 | 2/2009 | Ma | |
| 2010/0265300 A1 * | 10/2010 | Matroni et al. | 347/73 |

* cited by examiner

*Primary Examiner* — Kristal Feggins
(74) *Attorney, Agent, or Firm* — Joseph A. Yosick

(57) ABSTRACT

An ink jet ink composition includes an organic solvent, a binder, and a colorant. The colorant is selected from at least a first pigment and a second pigment. If the ink composition comprises carbon black, the carbon black is present in an amount less than 30% by weight of the total pigment content.

24 Claims, 4 Drawing Sheets

PIGMENTED INK JET INK COMPOSITION

FIELD OF THE INVENTION

The present invention relates to an ink jet ink composition in general, and to a pigmented ink composition in particular.

BACKGROUND OF THE INVENTION

In ink jet printing, printing is accomplished without contact between the printing device and the substrate on which the printed characters are deposited. Briefly described, ink jet printing involves projecting a stream of ink droplets to a surface and controlling the direction of the stream, e.g., electronically, so that the droplets are caused to form the desired printed image on that surface. This technique of noncontact printing is well suited for application of characters or decorative marks onto a variety of surfaces including porous and non-porous surfaces.

One of the most common forms of inkjet for marking products in production is CIJ (continuous ink jet) that includes single, multiple, and array-nozzle printers. CIJ printers can deliver a wide range of inkjet ink formulations that serve various industrial applications, particularly coding and marking applications. It is known in the art that current generation CIJ printers must not only solve these application needs but must also meet customer reliability expectations—that is, they must have a high proportion of 'uptime' as opposed to periods when they require maintenance such as print head cleaning due to a printer fault or poor print quality. Printers are expected to run without intervention for days or weeks and when typical ink buildup inside the print head results in the need for a print head cleaning, the cleaning process is desirably accomplished by a simple wash-down of the nozzle and other print head components using a cleaning solution.

For high-durability applications where printed images must withstand rigorous adhesion, transfer resistance, and light or heat fastness requirements, pigmented inks are often used. High contrast is also important in these applications. Even though CIJ printers can reliably print pigmented inks, these inks often create the most reliability problems. For example, applications requiring dark contrast (e.g., printing onto light substrates where ink transfer resistance or light fastness is required, such as PVC wire and cables) often use carbon black based inks. Carbon black, however, can be a particularly difficult pigment to use because it may form conductive films on the components in the print head. These films can become more persistently conductive over time, which may eventually negatively impact printer reliability and reduce uptime. Unfortunately, there are no prescriptive methods or readily available materials that can provide inks with dark print contrast, good light stability, good transfer resistance, and the expected level of CIJ printer reliability.

BRIEF SUMMARY OF THE INVENTION

The invention relates to ink compositions for continuous ink jet printers that provide a generally black color. In particular, the ink compositions include mixtures of non-conductive pigments that can serve as replacements for the ink compositions that instead use large amounts of conductive carbon black as the primary colorant, thereby generally providing increased printer uptime between required printhead maintenance and equivalent application performance, particularly printed image contrast that is acceptable for the desired applications.

In one aspect, an ink jet ink composition includes an organic solvent, a binder, and a colorant. The colorant is selected from at least a first pigment and a second pigment which may be an organic pigment or carbon black. In another embodiment, the colorant includes a third pigment. If the ink composition includes carbon black, the carbon black is present in an amount less than 35% by weight of the total pigment content.

In another aspect, a method includes directing a stream of droplets of the ink jet ink composition to a substrate and allowing the ink droplets to dry, thereby printing an image on the substrate. The ink jet ink composition includes an organic solvent, a binder, and a colorant. The colorant is selected from at least a first pigment and a second pigment which may be an organic pigment or carbon black. In another embodiment, the colorant includes a third pigment. If the ink composition includes carbon black, the carbon black is present in an amount less than 35% by weight of the total pigment content.

DETAILED DESCRIPTION OF THE INVENTION

Figure 1:
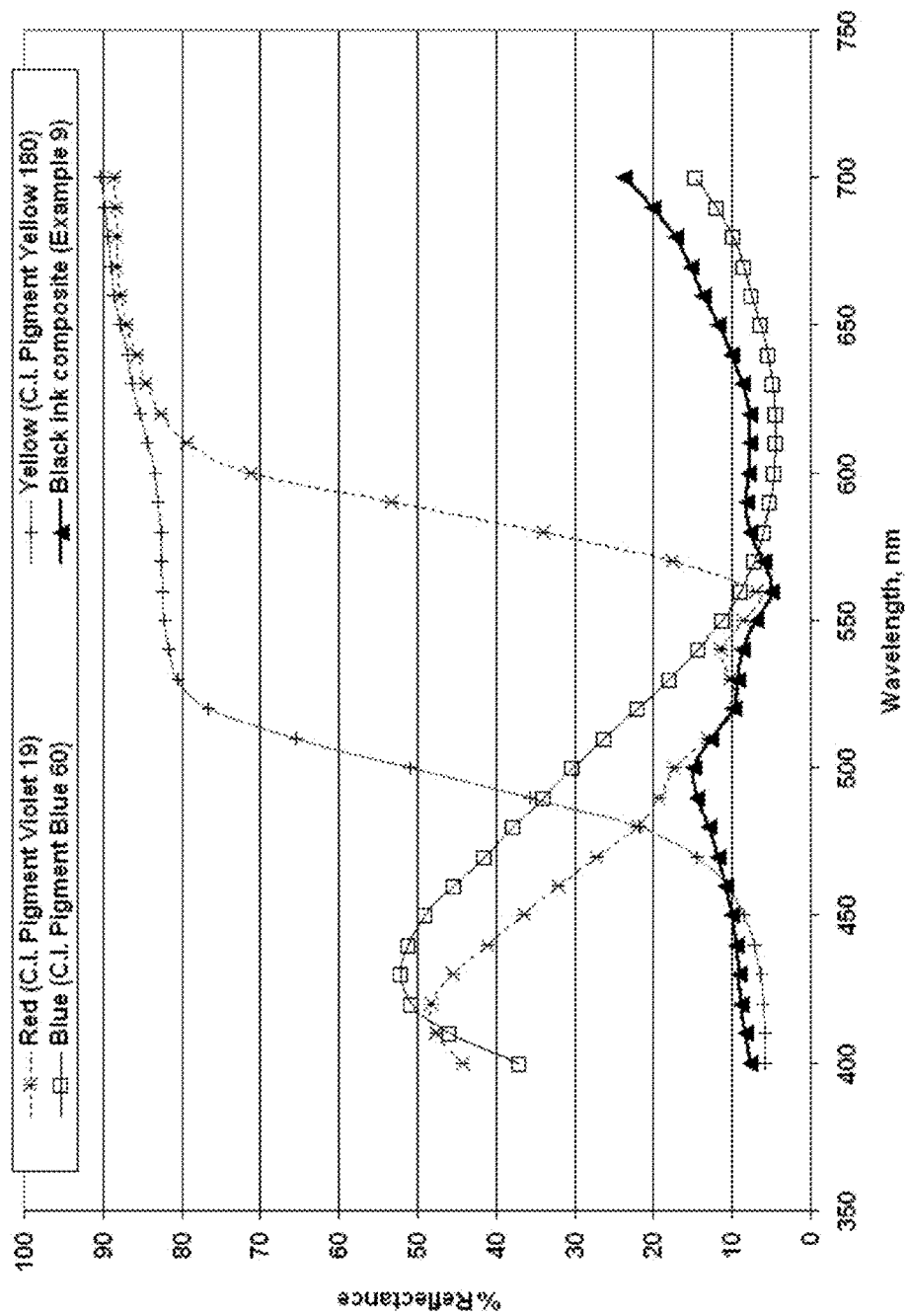
FIG. 1 is a graph showing overlay and composite reflectance spectra of a black ink including three different pigments.

The disclosure provides an ink jet ink composition including an organic solvent, a binder, and at least a first pigment, a second pigment and optionally a third pigment.

Current CIJ designs in general use electrostatic means to control drops by selectively charging and deflecting drops in-flight. Drops are continuously generated at a nozzle by inducing break-off from a continuous stream of ink in the presence of a variable electrostatic field created by a charging electrode that places a discrete charge on selected drops. Charged drops subsequently pass through a second electrostatic field wherein the field potential induces deflection on charged drops either to direct the drops to leave the ink system as printed drops or to be reused in the system. This general mechanism is also used in binary array CIJ printing which is defined here as a variant of CIJ technology.

Due to requirement that the printed drops be separated after ejection from the nozzle and while in flight, the electroactive components responsible for the electrostatic mechanism are often exposed directly to ink. These components are very sensitive to electrical cross-talk or interference that may arise from the use of any fluids that may form persistent conductive pathways on otherwise insulating surfaces. Without limiting the number of ways that fluids could cause issues with CIJ printers, one possibility is that the conductive films interfere with the circuitry involved with sensing the drops after break-off. Various mechanisms exist for sensing these drops, but the general purpose for doing so is the same. Determining the precise charge on the drops is necessary for maintaining good charge waveform timing. While the voltage is easily detected, the actual charge on each drop is very low; hence, the charge detection mechanism might easily be foiled by the presence of these persistent conductive paths. Capacitive sensing mechanisms employed may exhibit reduced detector efficiency by a conductive layer formed on top of the sensors. Another possibility is that conductive films formed on the insulating plastic components within the printed head will provide a pathway between the earth plate and the drop charging electrodes or between the earth plate and the high voltage drop deflection plate, leading to inaccurate drop charging and/or deflection, which may further lead to poor print quality and unacceptable printer uptime.

Detrimental effects due to using inks that form conductive films could take the form of reduced running time between cleanings (or mean time between maintenance, MTBM), increased frequency of cleanings, increased duration of cleaning and/or maintenance and possibly the need for physically-abrasive cleaning to remove the conductive film. The latter is concerning as it could lead to damage to the sensitive print head components.

Carbon black inks are often used due to the pigment's optical characteristics of strong contrast and relatively even absorption across the visible light spectrum. Inks using carbon black, most commonly C.I. (Color Index) Pigment Black 7, can also provide good permanence (light stability, ink transfer resistance, and solvent fastness) after printing. Pigment Black 7 dispersions are commercially available from several sources exhibiting good shelf-life stability, low primary particle size, low sedimentation rates, and economical costs. Hence, this pigment is typically used in black pigmented inkjet inks.

However, carbon black inks tend to form conductive films after drying and cleaning and in doing so are detrimental to CIJ ink jet printer operation. The conductivity of such films depends on the nature of the ink formulation, but all conventional CIJ inks that contain carbon black are susceptible to this same problem. During normal printer operation, dried ink will typically accumulate on surfaces of the print head. To remove this ink buildup, a cleaning fluid is usually sprayed onto the print head until the dried ink is substantially removed. After washing away the dried ink, however, a more conductive persistent film may result that is impervious to further cleanings. It is believed, without being bound to a particular theory, that the electrically insulating binder resins and pigment dispersing agents used in the ink are removed from the surface of the pigment particles in the washing process. The primary carbon pigment particles remain physically adsorbed to the print head and form a conductive network. These carbon pigment particles may thus accumulate on the print head surface after subsequent washings. In this way, persistent conductive pathways are formed between the electroactive components on the head across what once were electronically insulating components.

The persistent electrical conductivity of the pigment films that result from washing away of the insulating resins and dispersants may be present immediately before washing, immediately after washing or but often take many iterative cleaning steps prior to development. Hence, during routine printer operation, operators might not perceive the detrimental effects of using a carbon black based ink for some measurable operational period.

Dye-based inks, although very commonly used in ink jet, can not match the functional performance of carbon black based inks in specific applications. There are few if any options for alternative black pigments that can mimic the properties of carbon black, and also not exhibit the problem of electrical conductivity in the dried state. Many of these pigments are inorganic in nature and possess large primary particle sizes or densities that make them impractical for reliable ink jet inks. For example, C.I. Pigment Black 1 (analine black or P.B.1 for short) and C.I. P.B.10 (graphite) are also conductive. C.I. P.B.2, 3, 4 and 5 are not fast toward common solvents as is carbon black. C.I. P.B.31 and C.I. P.B.32 (perylene black) are green and lack sufficient contrast in comparison with carbon black, and are also difficult to stabilize in inks. C.I. P.B.8 (charcoal black) and C.I. P.B.9 (bone black) contain inorganic impurities that render them unsuitable for use with inkjet. Hence, there is no known suitable black pigment replacement for ink jet inks.

Thus, the present disclosure provides ink jet compositions using pigments other than carbon black to obtain an acceptably dark image while avoiding the above-mentioned conductivity problems. The ink jet ink compositions include an organic solvent, a binder, and at least a first pigment and a second pigment. If carbon black is present in the composition, it is preferably in an amount less than 35% by weight of the total pigment content. In a further embodiment, the carbon black is in an amount less than 30%, 25%, 20%, 10%, or 2% by weight of the total pigment content. Even more preferably, the ink composition is substantially free from added carbon black.

The first and second pigments are preferably selected so that they are complementary in the color spectrum to produce a dark-colored image similar to black. In one embodiment, the first pigment is a blue shade violet or blue pigment and the second pigment is a yellow or orange pigment. The first pigment preferably has a strong visible absorption and a peak wavelength in the range of 550 to 640 nm. The first pigment also preferably possesses an extinction coefficient of at least 300 at this wavelength. The second organic yellow pigment is a red-shade yellow or orange pigment and preferably has a strong visible absorption with a maximum in the range of 420 to 530 nm. More preferably, the second pigment preferably absorbs with a maximum in the range of 480 to 530 nm.

In yet another embodiment, the ink composition includes three pigments. The first pigment is a blue pigment with a maximum absorption between 550 and 650 nm; a second pigment is a yellow pigment with a maximum absorbance less than 500 nm; and, a third pigment is a red or red-shade violet organic pigment with a maximum absorbance between 470 and 590 nm In an embodiment, the pigments may be organic pigments. Organic pigments are defined as those that contain defined chemical structures with moieties comprising C—H interatomic bonds; thus, as used herein, carbon black is not an organic pigment.

Turning now to the color appearance of ink on a substrate, all non-absorbed light is reflected to some degree. A typical reflectance profile for a film on paper of such an ink is provided in FIG. 1. FIG. 1 is a graph showing the reflectance of three separate inks each with a different colored pigment (red, yellow and blue). FIG. 1 also shows the resulting composite reflectance spectrum for an embodiment of an ink using all three of the same pigments. The spectrum of the composite ink film when applied with a thickness of at least 0.5 mils shows a % Reflectance of less than 30% across the entire visible range (400 to 700 nm) as shown in FIG. 1.

The first pigment is preferably a blue shade violet or blue pigment. Suitable blue pigments include but are not limited to phthalocyanine or phthalocyanine metal-complex pigments such as C.I. Pigment Blues 15 (and its derivatives—e.g., pigment blue 15:1, 15:2, 15:3, 15:4, 15:6), 16, 17, 68, 75, 76, 79; triphenylemethane pigments such as C.I. Pigment Blues 24, 61 (and its derivatives), 62; anthraquinone pigments such as Pigment Blue 60 (also termed indanthrone blue); and azo or disazo pigments or metal complexes thereof including C.I. Pigment Blue 27. Blue shade violet pigments include triaryl- or trialkymethane pigments such as C.I. Pigment Violet 2; anthraquinone pigments such as C.I. Pigment Violets 7, 31, 33 or their derivatives; dioxazine pigments such as Pigment Violets 23 and 35; azo pigments such as Pigment Violets 44 and 50; and any similar pigments characterized by the general pigment classes triarylmethanes; anthraquinones; dioxazines; and azos. Preferred first pigments may be a dioxazine pigment. In one embodiment, the first pigment may be selected from C.I. Pigment Violet 23, C.I. Pigment Violet 34, C.I. Pigment Violet 35, C.I. Pigment Violet 37, and C.I. Pigment Blue 80. Preferred first pigments may further be of the anthraquinone variety such as C.I. Pigment Blue 60 or of the phthalocyanine variety, such as C.I. Pigment Blue 15:3 and C.I. Pigment Blue 15:4.

The second pigment is preferably a yellow pigment. Green or yellow-shade yellow pigments are suitable, while red-shade yellow or orange pigments are preferred if the ink composition only includes two pigments. Suitable yellow pigments would include any of the general classes of, but are not limited to, azo or monoazo yellow pigments or metal complexes thereof such as C.I. Pigment Yellows 1, 3, 5, 6, 9, 10, 12, 14, 16, 17, 55, 61, 62, 63, 65, 74, 75, 77, 81, 83, 87, 93, 94, 95, 97, 98, 104, 105, 111, 113, 116, 120, 126, 127, 128, 130, 133, 134, 136, 165, 166, 168, 169, 170, 172, 174, 176, 183, 190, 191, 200, 204; anthraquinone yellow pigments such as C.I. Pigment Yellows 24, 147, 150, 151, 152, 193; isoindolinone yellows such as C.I. Pigment Yellows 109, 110, 138, 139, 173; azomethines and metal complexes thereof such as C.I. Pigment Yellow 129; dioxime metal complexes such as C.I. Pigment Yellow 153, and, benzimidazolone yellows such as C.I. Pigment Yellows 154, 155, 156, 175, 180, 181, 194. The yellow pigment may preferably be a benzimidazolone pigment or an isoindolinone pigment. A preferred class of red-shade yellow pigments are isoindolinone yellows such as C.I. Pigment Yellow 139. Examples of other preferred yellow pigments are C.I. Pigment Yellow 83, C.I. Pigment Yellow 93, C.I. Pigment Yellow 110, C.I. Pigment Yellow 150, C.I. Pigment Yellow 151, C.I. Pigment Yellow 155, C.I. Pigment Yellow 180, and C.I. Pigment Yellow 1.

The optional third pigment is preferably a red or red-shade violet pigment. Suitable red pigments would include any of the general classes of, but are not limited to, azo or monoazo red pigments or metal complexes thereof such as C.I. Pigment Reds 1, 2, 3, 4, 5, 6, 7, 8, 9, 12, 14, 15, 17, 19, 21, 22, 23, 31, 32, 38, 48 (or derivatives thereof), 49 (or derivatives thereof), 52 (or derivatives thereof), 53, (or derivatives thereof), 57 (or derivatives thereof), 58, (or derivatives thereof), 60 (or derivatives thereof), 61, 62, 63, (or derivatives thereof), 114, 119, 120, 139, 144, 146, 148, 150, 166, 170 (or derivatives thereof), 175, 175, 183, 184, 185, 187, 188, 193, 211, 212, 213, 214, 221, 238, 239, 242, 243, 245, 253, 256, 258, 262, 266, 268, 269, 273; toluidine red pigments such as C.I. Pigment Reds 13, 147; anthraquinone red pigments such as C.I. Pigment Reds 83 (or derivatives thereof), 89, 168, 177, 194, 226; xanthene red pigments such as C.I. Pigment Red 90 (or derivatives thereof); quinacridone reds such as C.I. Pigment Reds 122 (or derivatives thereof), 173, 192, 202, 206, 207; perylene reds such as C.I. Pigment Reds 123, 149, 178, 179, 190, 224; organic naphthol carbamides such as C.I. Pigment Red 160; isoindolinone reds or metal complexes thereof such as C.I. Pigment Reds 260, 271; benzimidazolone reds such as C.I. Pigment Reds 171, 180, 208, 209; pyrazoloquinazolone reds such as C.I. Pigment Reds 251 and 252; pyrrole reds such as C.I. Pigment Reds 164, 254, 255, 270, 272, 274; and heterocyclic nickel complexes such as C.I. Pigment Red 256. Examples of preferred red colored pigments are C.I. Pigment Red 166, C.I. Pigment Red 144, C.I. Pigment Red 185, C.I. Pigment Red 254, C.I. Pigment Red 202, C.I. Pigment Red 122, and C.I. Pigment Violet 19. Red shade violet pigments may further included xanthene pigments such as C.I. Pigment Violets 1, 2; anthraquinone pigments such as C.I. Pigment Violets 5, 6, 7, 8, 20, 26, 29, 31, 40, 46, or their derivatives; quinacridone violets such as C.I. Pigment Violet 19; dioxazine pigments such as C.I. Pigment Violets 23 and 37; indigoid pigments such as C.I. Pigment Violet 38; and any similar pigments characterized by the general pigment classes xanthenes; anthraquinones; quinacridones; dioxazines; and indigoids.

If only two pigments are used, in one embodiment the first pigment is a blue violet or blue pigment and the second pigment is a red-shade yellow or orange pigment. Suitable orange pigments may for example, monoazo or disazo orange pigments such as C.I. Pigment Oranges 1, 3, 13, 16, and 22; benzidine oranges such as C.I. Pigment Oranges 13 and 16; pyrazolone oranges such as C.I. Pigment Orange 34; benzimidazolone oranges such as C.I. Pigment Oranges 36 and 64; and isoindolinone oranges such as C.I. Pigment Oranges 42, 69, and 86.

In another embodiment, the first pigment is a green colored pigment and the second pigment is a red or red shade violet pigment. In this embodiment, the first pigment is preferably C.I. Pigment Green 7 or a green-shade black pigment such as perylene black (i.e., C.I. Pigments Black 31 or 32). The second pigment is preferably selected from any of the aforementioned red shade violet or red pigments, but the most preferred pigments would be selected from C.I. Pigment Red 122, C.I. Pigment Red 202 and C.I. Pigment Violet 19. In an embodiment with three pigments, the first pigment is a blue shade violet or blue pigment, the second pigment is a yellow pigment and the third pigment is a red pigment or a red shade violet pigment.

The pigments may be provided in any suitable form. The pigments may come in pre-dispersed form. Suitable pre-dispersed materials containing some of the pigments named above or Pigment Black 7 (carbon black) are available from BASF Corporation under the trade name Microlith; Clariant Corporation under the trade names Renol, Hostaprint or Permajet; Gibraltar Chemical Works Corporation under the trade names of Vinyl-jet or Versa-jet; Penn Color Corporation under the trade name Acroverse; or, Mikuni Color Coporation.

In any of the embodiments above, the total pigment may be present in an amount from about 0.5% to about 12%, preferably from about 2% to about 10%, and more preferably from about 3% to about 8% by weight of the ink composition. If two pigments are used, the ratio of the weight of the first pigment to the second pigment is preferably between 0.3 and 4. If three pigments are used, each pigment is preferably present in amount between 20% by weight and 50% by weight of the total pigment content. In a specific embodiment of a three pigment ink composition, the ratio of the sum of the mass of a red pigment or a red shade violet pigment plus the mass of a yellow pigment, to the mass of a blue shade violet or blue pigment is between 1.0 and 3.5

The pigments suitable for use in the ink composition may have a suitable range of mean particle sizes in methyl ethyl ketone as determined either by the laser light scattering solution-based sizing method or by direct microscopic examination, such as from about 0.01 microns to about 10 microns, preferably from about 0.01 microns to about 1 microns, and more preferably from about 0.01 microns to about 0.6 microns.

When the ink composition is applied to a paper substrate, such as with a #5 wire-wound draw down bar (available from Byk-Gardner, Inc.), the dried ink composition preferably has an optical density (O.D.) of at least +1.0, preferably at least 1.8. The wet applied coating thickness should be at least 0.5 mils or 12.7 microns. The O.D. may be measured using an Xrite Series 500 spectrodensitometer using the Xrite O.D. method (based on ANSI CGATS.5: 1993) and comparing against white paper as the reference background.

Alternatively, the quality of the printed images may be assessed by measuring $L^*a^*b^*$ in CEILAB coordinates (at D65°/10° illuminant/observer angles) of the above mentioned draw-down samples and performing a comparison with the white paper background. The dried ink composition preferably has measurable color difference from the background defined by an absolute ΔL* from the background of at least 50 and a reflectance less than 30% for any visible light wavelength. Also, the ΔL* difference between the ink and a comparable carbon black ink is preferably less than 35, more preferably less than 20. The ΔE overall color shade difference between the ink and a comparable carbon black ink is preferably less than 35, more preferably less than 20. The white paper background used for either method should exhibit the following L*a*b* characteristics: L*=95±5; a*=0±5; b*=1±5. In a preferred embodiment, the ink composition appears substantially black when printed on a white substrate. As a reference value, true black is defined herein as having L*a*b* values of 0, 0, and 0 respectively. An ink that is substantially black is defined as an ink where the ΔE difference between the ink and true black is less than 40 when the ink is drawn down with a thickness of at least 0.5 mils.

Figure 2:
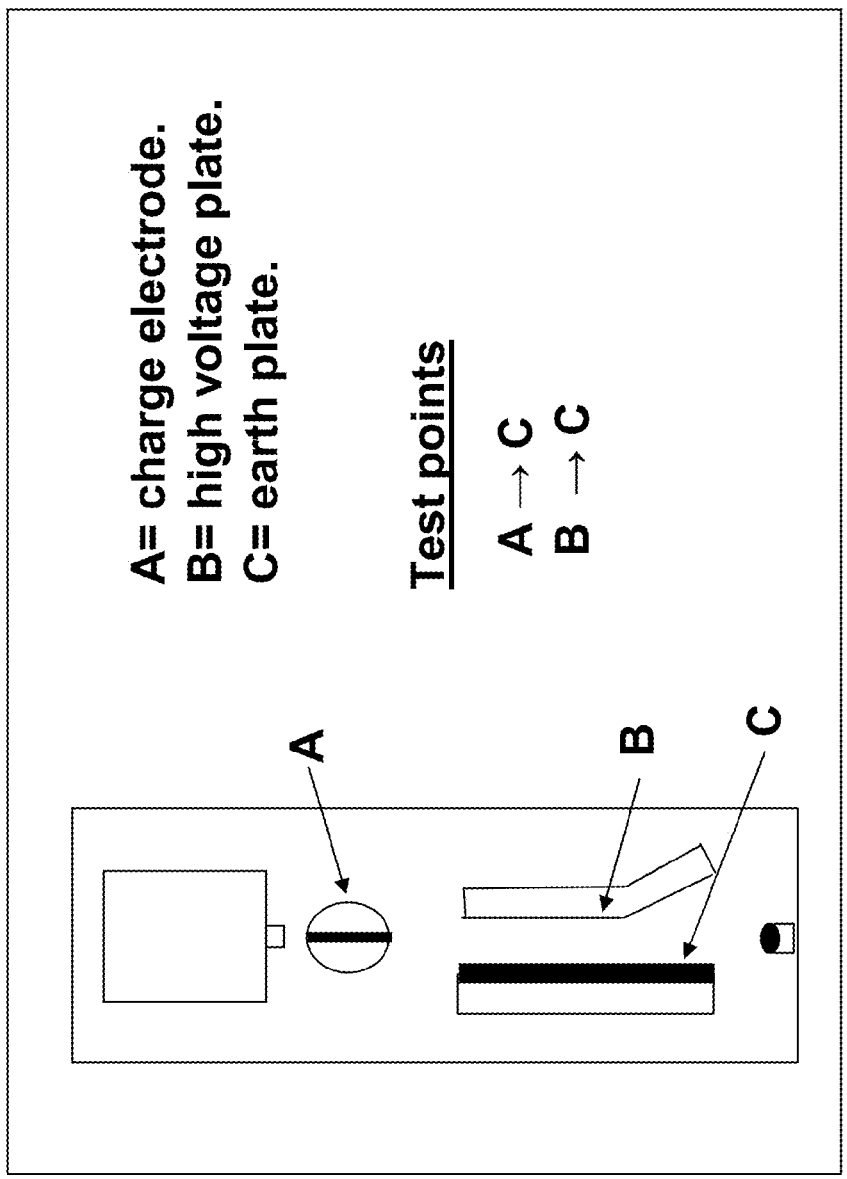
FIG. 2 is a schematic of test points of an embodiment of a CIJ print head.

As stated previously, the dried ink composition is preferably substantially non-conductive either prior to or after cleaning with an appropriate cleaning solution. To gauge the compatibility of the ink with the CIJ mechanism, a Residual Conductivity Test is conducted to evaluate the tendency for the ink to form persistent conductive films. A high sensitivity ohmmeter can be used to assess the conductivity of the ink film or of any residual ink film left behind after cleaning. For example, a Fluke 1587 (or equivalent) can be used in 'insulation test' mode applying a voltage of 1000 V (at 1 milliamperes and 1 megaohms) across the test probes. An appropriate test surface would be, for example, an actual print head from a Videojet® 1000 series printer such as the Videojet® 1510 printer. Suitable test points are the electroactive surfaces on the print deck as is defined in FIG. 2. The test points A or B to earth C are insulated by the plastic material in the print deck assembly onto which the electroactive surfaces are attached. The electroactive surfaces are typically conductive and metallic, but might be covered with a dielectric material. The dried ink or the residual ink film on the plastic surface after washing off the dried ink should not be sufficiently conductive so as to result in measurable conductivity between test points A and C or B and C. The resistance between these test points should be at least 1.0 Giga ohms, and is preferably beyond the Fluke instrumental detection limit of at least 2.2 Giga ohms. The resistance should be measured across a fixed surface length of approximately 1 cm as the resistance is proportional to the length. Alternatively, in place of an actual printhead a 2 inch×2 inch rectangular sheet of nylon plastic may be used to apply and wash-off the ink and test the resistance in a more generalized manner. Thus, when the ink composition is applied to a substrate, allowed to dry, and cleaned with solvent, a location of the substrate where the dried ink composition was located has a resistance of at least 1 gigaohms when measured across any two selected points 1 cm apart on the location of the substrate, after at least 50 cleaning cycles are done.

A comprehensive test procedure would involve repeated cycles including steps of: 1) applying the ink to the surface; 2) allowing the ink to dry on the surface (70° C. for 10 minutes); 3) cleaning the ink with a suitable cleaner for 1 minute; and 4) measuring resistance of the residual ink film on the surface. Preferably, the residual ink film after repeated application of ink and washing for at least 50 test cycles would also not develop a measurable resistance value below the instrumental detection limit defined above.

Figure 3:
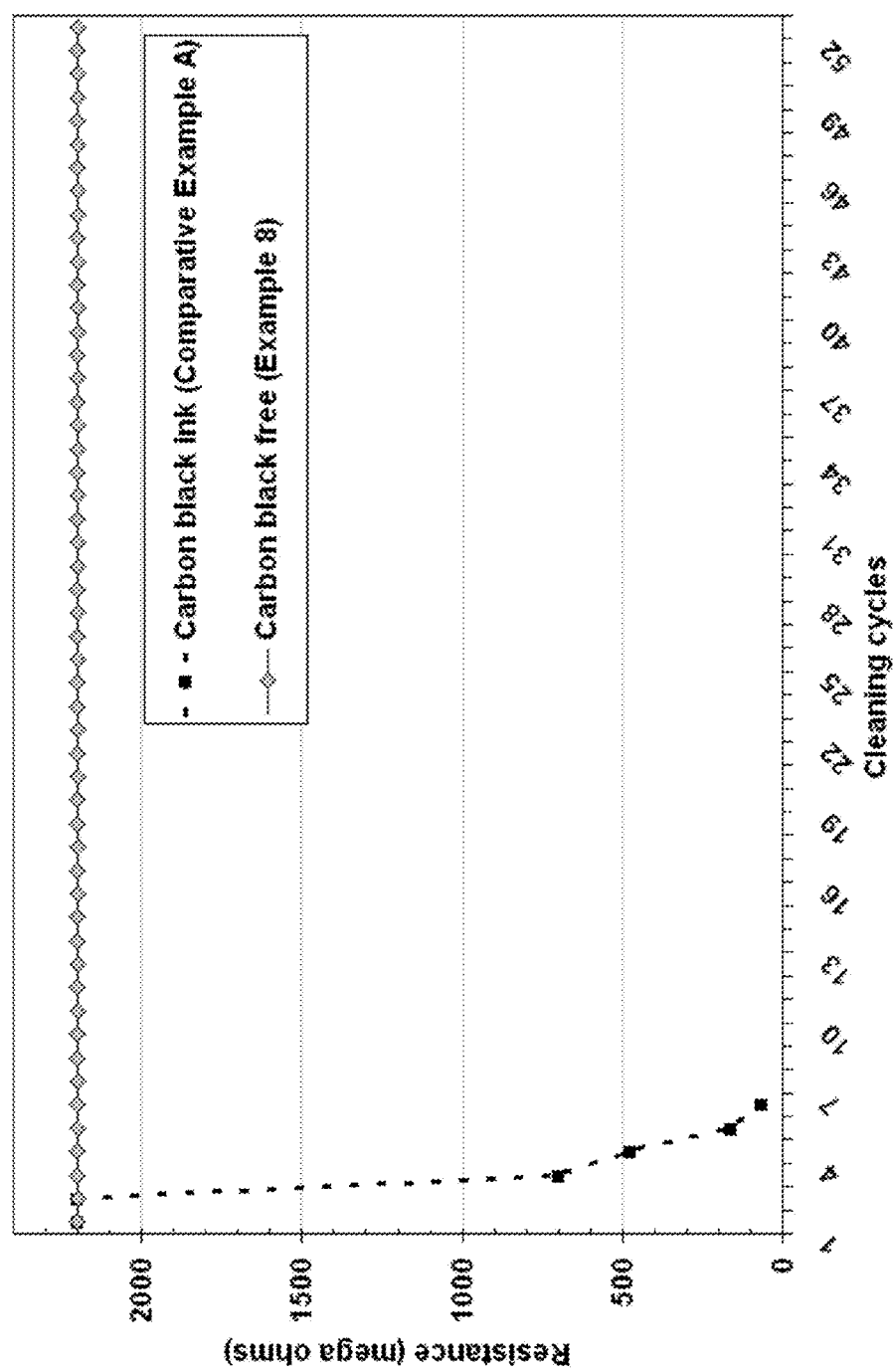
FIG. 3 is a graph showing Residual Conductivity Test results for a carbon black ink in comparison with an inventive ink.

When the print deck is treated with a carbon black containing ink and cleaned as prescribed above, it will begin to exhibit reduced resistance (increased conductivity) after a limited number of cycles due to the residual ink that is formed. FIG. 3 shows the measurable change in electrical resistance tested after cleanings across test points to earth for an ink containing carbon black at full color strength. FIG. 3 shows that a measurable drop in resistance is observed in fewer than ten printhead cleaning cycles. For current embodiments of the ink compositions, no measurable change in resistance was observed for more than 50 comparable cleaning cycles. Moreover, the ink compositions disclosed herein will in theory never form such a residual conductive film and therefore no measurable reduction from the >2.2 gigaohms instrumental limit of detection would be expected to be found for any number of prescribed cleaning cycles. It should be noted that the upper limit for measuring resistance with the Fluke device is 2.2 gigaohms; therefore, the actual resistances of the dried ink are higher than 2.2 gigaohms.

It should be noted that all CIJ or binary array printers will be susceptible to this failure when using an ink composition containing carbon black. It is therefore currently understood that all such printers will suffer reduced MTBM when running carbon black containing inks at some point in their usable life regardless of the ink or printer brand or the particular materials used for printhead construction. MTBM is defined as the total time printing or ready to print (or run time) divided by the number of head cleanings required that are not due to standard startup and shutdown sequences. The condition where reduced MTBM is observed with conventional carbon black based inks will either be temporary or permanent but will result in the need to restore the printer with non-standard cleaning methods or parts replacement.

Any suitable organic solvent can be used as the ink carrier of the ink composition. Preferably, the primary organic solvent is one that exhibits a low boiling point. Small amounts of high boiling solvents can also be employed in combination with the low boiling solvent. Examples of suitable organic solvents include ketones, such as acetone, methyl ethyl ketone, diethyl ketone, methyl isobutyl ketone, cyclohexanone, and the like; esters such as methyl acetate, ethyl acetate, n-propyl acetate, isopropyl acetate, n-butyl acetate, t-butyl acetate, amyl acetate, methyl lactate, ethyl lactate, n-propyl lactate, isopropyl lactate, n-butyl lactate, methoxy propanol acetate, and the like; alcohols such as methanol, ethanol, n-propanol, isopropanol, n-butanol, t-butanol, n-pentanol, n-hexanol, benzyl alcohol, and the like; diacetone alcohol; glycol ethers or glycol ether acetates such as methoxy propanol, dipropylene gycol methyl ether, propylene glycol propyel ether, propylene glycol butyl ether, tripropylene glycol methyl ether, butylene glycol methyl ether, dibutylene glycol methyl ether. dipropylene gycol methyl ether acetate, propylene glycol propyl ether acetate, propylene glycol butyl ether acetate and the like; and amides, as well as mixtures of two or more of the foregoing. Preferably, the organic solvent includes lower ketones, lower alcohols and mixtures thereof. Methyl ethyl ketone is a preferred solvent, optionally in combination with another solvent, i.e. a co-solvent, e.g., methoxypropyl acetate, butyl lactate, or ethanol.

The solvent may be present in any suitable amount, for example, in an amount 40% or more, 50% or more, 60% or more, about 70% or more, about 80% or more, by weight of the ink composition. In an embodiment, the solvent may be present in an amount from 70% to about 95%, preferably from about 75% to about 92%, and most preferably from about 80% to about 90% by weight of the ink composition.

To enable inks which dry at ambient temperatures on the substrate within about 5 seconds, the amount of high boiling component needs to be limited. The boiling point for pure low boiling solvents is defined as values below 95° C. at atmospheric pressure. The preferred minimum ratio of high boiling to low boiling solvent that can be employed is about 8; a more preferred maximum ratio is about 20. The printed inks dry within 5 seconds on non-porous plastic substrates such as HDPE.

The ink composition preferably includes little or no water. If water is present, it is preferably present in an amount less than 5%, more preferably less than 4%, even more preferably less than 2%, and most preferably less than 1% by weight of the ink composition. Most preferably, the ink composition is substantially free of water.

The ink composition includes at least one binder resin that has the purpose of providing ink adhesion on the substrates, and preventing transfer of the printed marks from the marked surface to any other surfaces that may come in contact after marking. In addition to the primary binder resin, one or more co-resins might be employed. Any suitable combination of resins may thus be employed. In an embodiment, the ink composition includes one or more resins selected from acrylic resins, vinyl chloride/vinyl acetate copolymers, polyesters; polyvinyl butyral resins, ethyl cellulose resins, polyurethane resins, modified rosin resins, phenolic resins, polyamide resins, cellulose ether resins, cellulose nitrate resins, polymaleic anhydride resins, acetal polymers, styrene/methacrylate copolymers, aldehyde resins, copolymers of styrene and allyl alcohols, epoxies, polyhydroxystyrenes and polyketone resins, and any combination thereof. The composition preferably includes one or more resins selected from vinyl acetate/vinyl chloride copolymers. Specific examples of these resins include those under the trade name of Vinnol from Wacker Chemie, Inc. These might include structurally modified carboxyl-vinyl chloride/vinyl acetate polymers such as Vinnol E15/45M, hydroxyl-modified vinyl chloride/vinyl acetate polymers such as Vinnol E15/40A or unmodified vinyl chloride/vinyl acetate polymers such as Vinnol H14/36. Vinyl acetate/vinyl chloride copolymers with any structural modifications or ratio of vinyl choride:vinyl acetate may be employed, as long as they are soluble in the carrier.

Acrylic resins may be homopolymers or incorporate two or more monomers with or without specific functional groups. Functionalized acrylic resins may be derived from an alkyl-type monomer such as a methacrylate plus a functionalized monomer such as acrylic acid or methacrylic acid; basic monomers such as amino acrylates; or neutral functional monomers that contain hydroxyl groups. Examples of suitable resins are those from Dow Chemical Corporation sold under the trade-name Acryloid or Paraloid or Dianal resins from Dianal Corporation. A specific example of a non-functionalized resin is sold under the trade name B-60 which is a methylmethacrylate and butylmethacrylate copolymer with a molecular weight of approximately 50,000 Daltons. A specific example of a preferred functionalized acrylic resin is Dianal PB-204. Other preferred resins are ones that incorporate pendant amine groups as is disclosed in U.S. Pat. No. 4,892,775.

Examples of acrylic resins also include styrene-acrylic resins which can be made by copolymerizing styrene with acrylic monomers such as acrylic acid or methacryl acid, and optionally with alkyl acrylate monomers such as methyl acrylate, methyl methacrylate, butyl acrylate, butyl methacrylate, hydroxyethyl acrylate, hydroxyethyl methacrylate, and the like made by BASF. under the trade name JONCRYL™. Examples of JONCRYL™ resins include JONCRYL™ 555, 586, 678, 680, 682, 683, and 67.

Examples of polyvinyl butyral resins are PIOLOFORM™ BN18, available from Wacker Chemie AG, and MOWITAL™ B20H available from Kuraray America, Inc. Examples of ethyl cellulose resins are Ethocel available from Dow Chemical.

The combined binder and co-resins may be present in any suitable amount, for example, in an amount from about 0.1% to about 30%, preferably from about 1% to about 15%, and more preferably from about 2% to about 12% of the ink composition.

The ink composition preferably has a low solution resistivity, such as within the range of about 20 to about 2000 ohm-cm. The desired resistivity can be achieved by the addition of an ionizable material or conductive agent which acts as a charge carrier in the liquid ink. Examples of such conductive agents include ammonium, alkali, and alkaline earth metal salts such as lithium nitrate, lithium thiocyanate, lithium trifluoromethanesulfonate, potassium bromide, and the like; amine salts such as dimethylamine hydrochloride, and hydroxylamine hydrochloride; tetraalkylammonium salts such as tetrabutylammonium bromide, tetrabutylammonium hexafluorophosphate, tetrabutylammonium thiocyanate, tetrapropylammonium bromide, tetrapropylammonium acetate, tetraphenylphosphonium bromide as well as ammonium acetate. Preferred conductive agents include lithium triflate, tetrabutylammonium hexafluorophosphate, tetrabutylammonium nitrate, tetrabutylammonium thiocyanate and tetrapropylammonium acetate. Any suitable amount of the conductive agents can be used. Normally, a conductive agent content of up to about 3% by weight of the ink composition provides the desired conductivity, typically in a range of about 0.5% to about 2%. In certain desired ink compositions, high solution conductivity is not necessary, and the conductive agent may be omitted.

The ink composition may be prepared by any suitable method known in the art for producing pigmented inks. This may include pre-dispersing a pigment in a suitably concentrated dispersion using a physical milling device or other means to reduce the primary or secondary particle size of the pigments or otherwise disperse them for later use in the ink composition. This dispersion may include suitable dispersing agents and/or resins. The dispersions would typically also include at least one plasticizer and/or carrier solvents.

Examples of suitable pigment dispersing agents include those available under the trade name Solsperse from Lubrizol, Inc.; the trade name EKFA from BASF, Inc.; and the trade name of BYK or DISPERBYK from BYK Chemie, Inc. More than one component might be present specifically to disperse and stabilize the pigments. It is possible that the dispersing agents will include any of the general chemical polymer families that are defined as suitable resins above (i.e., acrylics, amides, vinyls, urethanes, etc.). Hence, the dispersing agents can effectively be used as binding resins or co-resins and vice versa.

The ink composition may further include one or more additives such as plasticizers, surfactants, adhesion promoters, and mixtures thereof. Plasticizers may be polymeric and may be added in addition to a binder resin present, generally exhibiting molecular weights that are less than 5,000. Examples of suitable plasticizers include phthalate plasticizers, e.g., alkyl benzyl phthalates, butyl benzyl phthalate, dioctyl phthalate, diisobutyl phthalate, dicyclohexyl phthalate, diethyl phthalate, dimethyl isophthalate, dibutyl phthalate, and dimethyl phthalate, esters such as di-(2-ethylhexy)-adipate, diisobutyl adipate, glycerol tribenzoate, sucrose benzoate, dibutyl sebacate, dibutyl maleate, polypropylene glycol dibenzoate, neopentyl glycol dibenzoate, dibutyl sebacate, and tri-n-hexyltrimellitate, phosphates such as tricresyl phosphate, dibutyl phosphate, triethyl citrate, tributyl citrate, acetyl tri-n-butyl citrate, polyurethanes, acrylic polymers, lactates, oxidized oils such as epoxidized soybean oil, oxidized linseed oil, and sulfonamide plasticizers such as Plasticizer 8, available from Monsanto Co., St. Louis, Mo., which is n-ethyl o,p-toluene sulfonamide.

In certain embodiments, the plasticizer can be present in an amount from about 0 to about 5.0%, preferably from about 0.1 to about 2.5%, and more preferably from about 0.25 to about 1.0% by weight of the ink composition.

Examples of surfactants include siloxanes, silicones, silanols, polyoxyalkyleneamines, propoxylated (poly(oxypropylene)) diamines, alkyl ether amines, nonyl phenol ethoxylates, ethoxylated fatty amines, quaternized copolymers of vinylpyrrolidone and dimethyl aminoethyl methacrylate, alkoxylated ethylenediamines, polyethylene oxides, polyoxyalkylene polyalkylene polyamines amines, polyoxyalkylene polyalkylene polyimines, alkyl phosphate ethoxylate mixtures, polyoxyalkylene derivatives of propylene glycol, and polyoxyethylated fatty alcohols, fluorinated surfactants. Examples of a suitable polymeric silicone based surfactant are sold under the trade name Silwet. Examples of fluorinated surfactants include those sold under the trade name Zonyl from Dupont Corporation.

In any of the embodiments, the surfactant additive may be present in an amount from about 0.001 to about 1.0% by weight, preferably from about 0.005 to about 0.5% by weight of the ink composition.

The ink composition may have any suitable viscosity or surface tension. In embodiments the ink composition has a viscosity in the range of 1 cP to 10 cP, preferably in the range of 2 cP to 7 cP at 25° C. The ink composition preferably has a viscosity of between 2.5 and 5.0 at 25° C. The ink composition preferably has a surface tension from about 20 to about 35 mN/m at 25° C.

The present disclosure further provides a method for printing images on a substrate in a continuous ink jet printer including directing a stream of droplets of any of the embodiments of the ink composition to a substrate and allowing the ink droplets to dry, thereby printing images on a substrate. Examples of suitable general substrates include wire and cables, uncoated or coated papers, hard plastics, rubbers, soft plastics, polymer films, metals, glass, and ceramics. Particularly suitable substrates include wires and cables constructed with exterior-facing PVC and polyolefinic jackets, metallic cans or can lids, plastic-coated cans or can lids, plastic pouches, olefinic plastics or rubbers (e.g., PEX, cross-linked PE, LDPE, HDPE, PP), nylon, PVC or copolymers thereof, fluorinated plastics (e.g., PTFE, ETFE) or rubbers (e.g., chlorinate polyolefins, epichlorohydrin, norbonene, nitriles, fluorinated elastomers, styrene/butadiene, butyl, sulfonate, polysulfide, isoprene, nitrile, polysulfide, ethylene/acrylic), silicon plastics including blends with any of the aforementioned plastics, and hard or soft wire or cables including the aforementioned plastic or rubber types.

EXAMPLES

The following examples further illustrate the invention but, of course, should not be construed as in any way limiting its scope. The following Examples illustrate the preparation of an ink composition suitable for use in a continuous ink jet printer. In each case, the ingredients were combined and mixed as appropriate to create a homogeneous ink and the resulting mixture was filtered. The ink compositions were tested for color and contrast and printed where necessary to demonstrate printer compatibility or to generate test samples as needed.

The following materials were employed in the examples below. MEK was methyl ethyl ketone available from Ashland, Inc. Solsperse 38500 was a dispersant available from Lubrizol, Inc. AC1-0901-8 violet dispersion was obtained from Gibraltar Chemical Works, Inc. and contained approximately 24% C.I. Pigment Violet 23. Microlith AR3K blue dispersion is a solid dispersion available from BASF, Inc. and included about 48% C.I. Pigment Blue 60. 10B 1470 Paste was an experimental pigment dispersion containing 20% perylene black made for Videojet by Penn Color, Inc. AC1-0901-5 yellow dispersion was obtained from Gibraltar Chemical Works and contained approximately 27% C.I. Pigment Yellow 150. 81Y460 yellow was a solid dispersion available from Penn Color, Inc. and included about 48% C.I. Pigment Yellow 139. Vinnol resins E15/45M, E15/40A, and H14/36 are vinylacetate/vinylchloride ketone soluble thermoplastic resins available from Wacker Chemie, Inc. $TBAPF_6$ is tetrabutylammonium hexafluorophosphate available from Sigma Aldrich, Inc. Flexol EPO is an epoxidized soybean oil and is available from Dow Chemical, Inc. Silwet L7622 is a silicone-based surfactant available from Momentive Performance Materials, Inc. MHI Yellow, Blue and Red were dispersion available from Mikuni Color Corporation each of which contained 15% of pigment—C.I. Pigment Yellow 180, C.I. Pigment Blue 15:3 and C.I. Pigment Red 122, respectively. VI1-1002-4 Blue (24% C.I. Pigment Blue 60), VI1-1002-5 Blue (24% C.I. Pigment Blue 60), Vinyl Jet 305-35710 Yellow (17% Pigment Yellow 180), Vinyl Jet 306-36690 Violet (18% C.I. Pigment Violet 19), and Vinyl Jet 306-34520 Cyan (18% C.I. Pigment Blue 15:3) were experimental dispersions from Gibraltar Chemical Works Corporation. Microlith AR3K was a vinyl pigmented chip comprising approximately 50% C.I. Pigment Blue 60 and was available from BASF, Inc. Permajet E5B30 was a vinyl chip including approximately 50% C.I. Pigment Violet 19; and, Permajet HG 30 was a vinyl chip including about 50% C.I. Pigment Yellow 180, both available from Clariant, Inc. Ad Pro MTS was a low molecular weight epoxy co-resin available from Rit Chem Company, Inc. MHI Black dispersion contained 20% pigment black 7 and was available from Mikuni Color Corporation.

Comparative Example A was a commercially available carbon black-based pigmented ink, 16-8990 available from Videojet Technologies, Inc.

Example 1

One or Two Pigment Examples. These examples illustrate various embodiments of the ink composition comprising one or two pigments. Examples 1-5 were inventive samples. The materials employed in preparing the ink compositions, their amounts, and the formulation numbers are set forth in Table 1 below.

TABLE 1

Two Pigment Formulations with Mass Percentages by Component

| | Formulation components | | | | |
|---|---|---|---|---|---|
| | Example 1 | Example 2 | Example 3 | Example 4 | Example 5 |
| MEK | 74.5 | 65.80 | 87.5 | 83.1 | 69.0 |
| Solsperse 38500 | | | | 2.0 | |
| AC1-0901-8 Violet | 17.6 | 17.4 | | | |
| Microlith AR3K Blue | | | 10.1 | 8.0 | |
| 10B1470 Paste | | | | | 25.0 |
| MHI Red | | | | | 9.1 |
| AC1-0901-5 Yellow | | 10.4 | | | |
| 81Y460 Yellow | | | | 4.0 | |
| Vinnol E15/40A | 7.1 | 5.5 | 1.7 | | 5.0 |
| Vinnol H14/36 | | | | 2.0 | |
| $TBAPF_6$ | 0.8 | 0.8 | 0.8 | 1.0 | 0.9 |
| Silwet L7622 | | 0.05 | | | 0.1 |
| FORMULATION TOTAL | 100.0 | 100.0 | 100.0 | 100.0 | 109.1 |

Each ink composition was applied to white paper using a #5 wire-wound draw down bar. The optical density (O.D.) and L*a*b* values were measured using an Xrite Series 500 spectrodensitometer using white paper as a background, as shown in Table 2.

TABLE 2

| | Comparative Example A | Example 1 | Example 2 | Example 3 | Example 4 | Example 5 |
|---|---|---|---|---|---|---|
| Visual color | Black | Violet | Black | Blue | Black | Black |
| Total pigment content | 3.0 | 4.2 | 7.0 | 4.8 | 5.8 | 6.4 |
| First pigment | 0.0 | 4.2 | 4.2 | 4.8 | 3.8 | 5.0 |
| Second pigment | 0.0 | 0.0 | 2.8 | 0.0 | 1.9 | 1.4 |
| Carbon black content | 3.0 | 0.0 | 0.0 | 0.0 | 0.0 | 0.0 |
| Draw down contrast assessment — Optical density | 1.84 | 1.73 | 1.74 | 1.62 | 1.70 | 1.10 |
| L* | 10.2 | 17.2 | 13.1 | 25.9 | 17.6 | 31.0 |
| a* | 2.2 | 41.0 | 6.2 | 21.2 | −10.7 | 0.3 |
| b* | 6.1 | −55.3 | −5.1 | −60.6 | −8.9 | −4.9 |
| ΔE from Comparative Example A | 0.0 | 73.0 | 12.3 | 71.1 | 21.2 | 23.7 |
| ΔL from background | −84.4 | −77.4 | −81.4 | −68.7 | −77.0 | −63.6 |
| ΔL from Comparative Example A | 0.0 | 7.0 | 3.0 | 15.7 | 7.4 | 20.8 |

It can be seen that the various Examples 1-5 had optical densities ranging from +1.10 to +1.74, the highest of which (1.74) was similar to that of the Comparative Example A (+1.84). The L*a*b* measures relative to the white paper background are also provided in Table 2. Example 2 was a relatively good colorimetric match to the Comparative Example A, although the other black examples (Examples 4 and 5) also exhibited acceptable shade matches. All inks were found to have proper physical properties for the CIJ inkjet process (viscosity, solution resistivity, filterability and surface tension). Samples of the inks Examples 2 through 5 were printed using a Videojet® 1510 CIJ printer onto two PVC coated wires and a hard HDPE sheet test substrate. The printed samples all dried within 5 seconds after printing and showed acceptable visible code contrast with respect to comparative Example A. Example 2, which exhibited the closest ΔE match with Comparative Example A, was also the closest visual match. The Experimental Examples also exhibited similar adhesion transfer resistance and rub resistance on the tested substrates, to Comparative Example A.

Example 2

Examples 6 to 10 were ink compositions including three pigments—blue, red, and yellow—to achieve good contrast and color shade. The materials employed in preparing the ink compositions, their amounts, and the formulation numbers are set forth in Table 3 below.

TABLE 3

Three Pigment Formulations with Mass Percentages by Component

| | Example 6 | Example 7 | Example 8 | Example 9 | Example 10 |
|---|---|---|---|---|---|
| MEK | 47.25 | 54.15 | 85.74 | 61.76 | 58.15 |
| MHI Yellow | 11.43 | 13.30 | | | |
| MHI Blue | 11.43 | | | | |
| MHI Red | 22.86 | 13.30 | | | |
| VI1-1002-4 Blue | | 12.90 | | | |
| VI1-1002-5 Blue | | | | 12.02 | |
| Vinyl Jet 305-35710 Yellow | | | | 11.70 | 10.60 |
| Vinyl Jet 306-36690 Violet | | | | 12.16 | 19.40 |
| Vinyl Jet 306-34520 Cyan | | | | | 9.40 |
| Solsperse 38500 | | | 1.20 | | |
| Microlith AR3K | | | 2.50 | | |
| Permajet E5B 30 | | | 2.50 | | |
| Permajet HG 30 | | | 2.50 | | |
| Vinnol E15/45M | | | 2.40 | 1.41 | 1.50 |
| Vinnol E15/40A | 6.09 | 5.40 | | | |
| Ad Pro MTS | | | 2.40 | | |
| TBAPF$_6$ | 0.89 | 0.90 | 0.70 | 0.90 | 0.90 |
| Silwet L7622 | 0.05 | 0.05 | 0.06 | 0.05 | 0.05 |
| FORMULATION TOTAL | 100.00 | 100.00 | 100.00 | 100.00 | 100.00 |

Each ink composition was applied to white paper using a #5 wire-wound draw down bar. The optical density (O.D) and L*a*b* values were measured using an Xrite Series 500 spectrodensitometer using white paper as a background, as shown in Table 4.

TABLE 4

Three Pigment Formulation Color and Contrast Comparisons with Comparative Example A

| | | Example | | | | | |
|---|---|---|---|---|---|---|---|
| | | 16-8990 Comparative Example A | Example 6 | Example 7 | Example 8 | Example 9 | Example 10 |
| Visual color | | | Black | Black | Black | Black | Black |
| Total pigment content | | 3.0 | 6.9 | 7.1 | 3.8 | 7.1 | 7.0 |
| First pigment, blue | | 0.0 | 1.7 | 3.1 | 1.3 | 2.9 | 1.7 |
| Second pigment, yellow | | 0.0 | 1.7 | 2.0 | 1.3 | 2.0 | 1.8 |
| Third pigment, red | | 0.0 | 3.4 | 2.0 | 1.3 | 2.2 | 3.5 |
| Carbon black content | | 3.0 | 0.0 | 0.0 | 0.0 | 0.0 | 0.0 |
| Draw down contrast assessment | Optical density | 1.84 | 1.46 | 1.42 | 1.05 | 1.27 | 1.25 |
| | $L^*$ | 10.2 | 21.9 | 22.9 | 38.0 | 26.5 | 27.5 |
| | $a^*$ | 2.2 | −4.8 | −6.9 | −4.6 | −1.8 | 0.4 |
| | $b^*$ | 6.1 | −14.8 | −10.9 | −4.5 | −5.1 | −5.8 |
| | $\Delta E$ from Comparative Example A | 0 | 25.0 | 23.1 | 30.6 | 20.2 | 21.1 |
| | $\Delta L$ from background | −84.4 | −72.6 | −71.7 | −57.0 | −68.1 | −67.0 |
| | $\Delta L$ from Comparative Example A | 0.0 | 11.8 | 12.7 | 27.4 | 16.3 | 17.4 |

As is seen in Table 4, optical densities ranged between 1.05 and 1.46 for the inventive inks. ΔE's between the inventive Examples 6-10 and Comparative Example A range from between about 20 and 31. Δ L's between the inventive Examples 6-10 and the background range from −73 to −57. Δ L's between the inventive Examples 6-10 and the Comparative Example ranged between about 12 and 27. Samples of the ink compositions of Examples 6 through 10 were printed using a Videojet® 1510 CIJ printer onto two PVC-coated wires and a hard HDPE sheet test substrate. The printed samples all dried within 5 seconds after printing and showed acceptable visible code contrast and color with respect to comparative Example A. Whereas the average total amount of pigment to achieve the same contrast (O.D. or L* value) as the control was higher for Examples 6-10 as compared with the average for Examples 1-5, the average a* and b* were closer to true black (0 and 0 respectively) and the printed images appeared black to the eye. The Experimental Examples 6-10 also exhibited similar adhesion, transfer resistance and rub resistance on the tested substrates.

Example 3

The inks were evaluated for suitable black contrast by printing the inks at different pigment levels. In this way a suitable working range for the pigment level was determined. Several formulations with different pigment content (Examples 11 to 16) were made as shown in Table 5.

TABLE 5

Formulations for contrast determination

| Formulation Components | Example 11 | Example 12 | Example 13 | Example 14 | Example 15 | Example 16 |
|---|---|---|---|---|---|---|
| MEK | 69.75 | 76.10 | 81.90 | 87.69 | 90.00 | 88.05 |
| Microlith AR3K | 8.50 | 6.67 | 5.00 | 3.33 | 2.67 | 2.50 |
| Permajet E5B 30 | 8.50 | 6.67 | 5.00 | 3.33 | 2.67 | 2.50 |
| Permajet HG 30 | 8.50 | 6.67 | 5.00 | 3.33 | 2.67 | 2.50 |
| Vinnol E15/45M | — | — | — | — | — | 2.50 |
| Solsperse 38500 | 4.00 | 3.14 | 2.35 | 1.57 | 1.25 | 1.20 |
| $TBAPF_6$ | 0.70 | 0.70 | 0.70 | 0.70 | 0.70 | 0.70 |
| Silwet L7622 | 0.05 | 0.05 | 0.05 | 0.05 | 0.05 | 0.05 |
| FORMULATION TOTAL | 100.00 | 100.00 | 100.00 | 100.00 | 100.00 | 100.00 |
| Approximate total pigment, weight % | 12.75 | 10.01 | 7.50 | 5.00 | 4.00 | 3.75 |
| Pigment Blue 60 weight % | 4.3 | 3.3 | 2.5 | 1.7 | 1.3 | 1.3 |
| Pigment Yellow 180 weight % | 4.3 | 3.3 | 2.5 | 1.7 | 1.3 | 1.3 |
| Pigment Violet 19 weight % | 4.3 | 3.3 | 2.5 | 1.7 | 1.3 | 1.3 |

Each of the inks exhibited viscosities between 2 and 5 cp. Examples 14, 15 and 16 were printed using a Videojet® 1510 sample maker using a 70 micron nozzle onto white PVC wires and the resulting printed codes were visually evaluated for color and contrast as provided in Table 6.

TABLE 6

Contrast evaluations at various pigment content

| | Ink properties | | Color measurements, #5 draw down | | | | | | Printed code appearance | |
|---|---|---|---|---|---|---|---|---|---|---|
| EXAMPLE | Weight % pigment | Viscosity (cP) | L* | a* | b* | ΔL from Background | ΔL from Example A | ΔE from Example A | Color | Visual contrast |
| 11 | 12.8 | >20 | 8.8 | −4.6 | −4.2 | −85.9 | −1.4 | 12.5 | N/A (Viscosity too high) | |
| 12 | 10 | >10 | 13.0 | −5.6 | −4.4 | −81.6 | 2.9 | 13.5 | N/A (Viscosity too high) | |
| 13 | 7.5 | >10 | 19.0 | −6.0 | −4.8 | −75.6 | 8.9 | 16.3 | N/A (Viscosity too high) | |
| 14 | 5 | 4.3 | 29.9 | −5.6 | −4.8 | −64.7 | 19.8 | 23.9 | Black | Very good |
| 15 | 4 | 2.8 | 37.3 | −5.2 | −4.5 | −57.3 | 27.2 | 30.1 | Grey-Black | Good |
| 16 | 3.7 | 4.2 | 38.4 | −4.6 | −5.3 | −56.2 | 28.2 | 31.2 | Grey-Black | OK-Good |
| Comparative Example A | 3 | 3 | 10.2 | 2.2 | 6.1 | −84.4 | 0.0 | 0.0 | Brown black | Very good |

These contrast assessments, as well as the measured contrast of the ink draw-downs as performed in prior examples, were compared. To achieve contrast on-par with the Comparative Example A with the film generated by the #5 wire-wound bar required more than 12% of total pigment in the three pigment ink. However, the printed dots when visually assessed were far closer in contrast to the Comparative Example than this measure implied. In fact, with only about 3.7 to 5% total pigment, an acceptable level of contrast was attained for the inventive inks relative to Comparative Example A. Without being bound to theory, it is believed that the printed dots of the inventive formulation were thicker than the draw down films and hence they appear darker.

Example 4

16-8990 (Comparative Example A) was tested in a Videojet® 1000 series printer to determine the impact of carbon black on reliability normal operation. The printer had been operated using Comparative Example A for a period of approximately 500 hours before formal testing and data logging commenced. During testing, the print head surfaces were thoroughly cleaned after each printer fault employing MEK as the cleaner. For a similar run period, the inventive inks were also tested in a different 1000 series printer previously exposed only to non-carbon black inks for several hundred hours of operation. The relative results from running both printing trials are summarized in Table 7.

TABLE 7

Relative printer reliability

| | Printer Unit (Videojet ® 1000 Series) | |
|---|---|---|
| | Printer A | Printer B |
| Inks tested | Comparative Example A | Example 8 and Example 16 |
| Results for Residual Conductivity Test | Failed within 10 cleaning cycles | Did not fail test within 50 cycles |
| Total trial printing hours | 509 | 467 |
| Total trial failures requiring additional printhead cleanings | 6 | 2 |
| MTBM, hours | 85 | 234 |
| Shortest trial, hours | 10 | 119 |
| Longest trial, hours | 125 | 201 |
| Failures experienced | Electrical high voltage field failures and drop phasing failures. | Errant ink stream (non-electrical failure) |

For Printer A employing the ink composition of Comparative Example A that failed the Residual Conductivity Test (defined above) within 10 cleaning cycles, the total trial time was 509 hours with a MTBM of 85 hours. In addition, the printer uptime was progressively shorter due to failures related to charging and deflection. Printer B employing the inventive inks that passed more than 50 cycles of the Residual Conductivity Test ran for a similar number of trial hours but did not exhibit the same kinds of electrical failures observed in Printer A. The MTBM for the Printer B was also much higher at 234 hours.

Example 5

Figure 4:
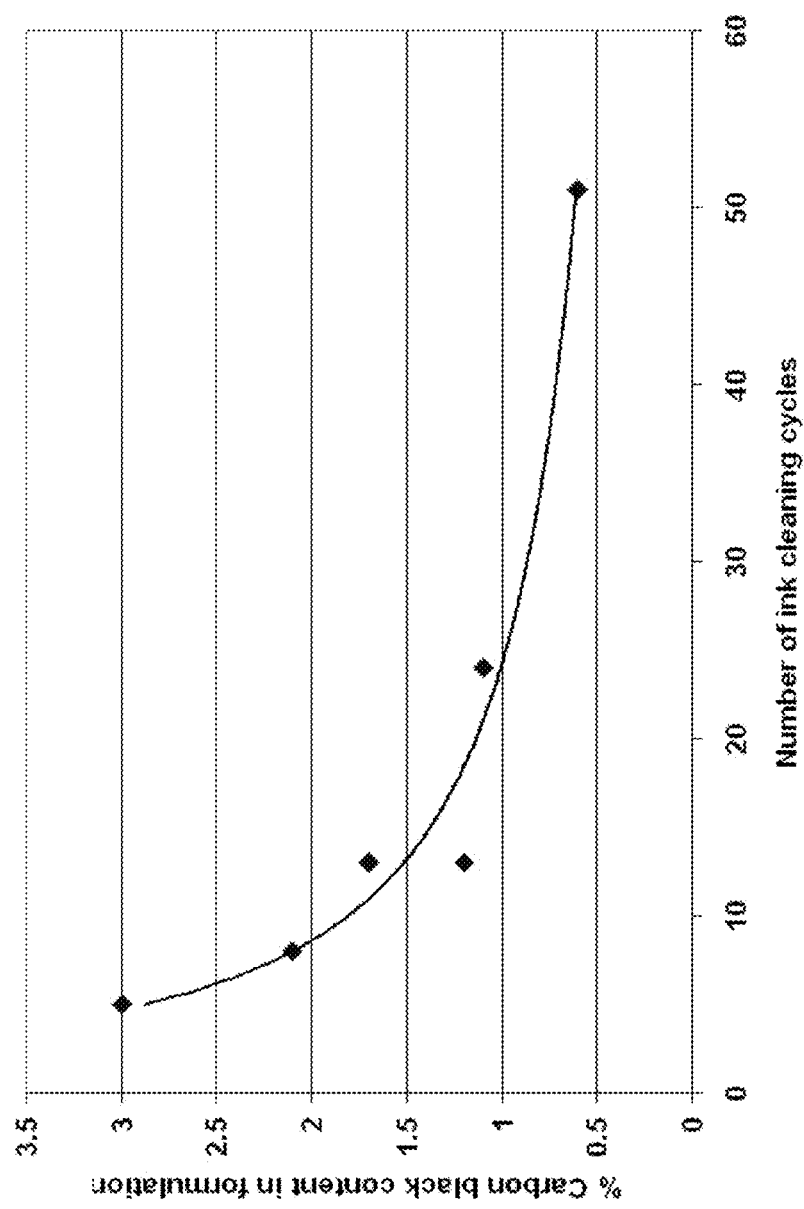
FIG. 4 is a graph showing a relationship between cleaning cycles to failure and formulation carbon black content.

Several different dilutions of Comparative Example A were created to test the impact on cleaning cycles to failure and assess if a feasible amount of carbon black could be employed. Comparative Example A was diluted with successive quantities of an ink base containing all components besides carbon black to yield several diluted solutions (or mock inks) with diluted carbon black levels. The data are depicted in FIG. 4, which shows the resulting number of cleanings to fail for Competitive Example A along with four other dilutions. FIG. 4 shows that by progressively reducing the conductive carbon black content in Comparative Example A an increased number of cleaning cycles are needed to reach the failure point where measurable resistance is seen between electroactive printhead components. However, the number of cycles to failure remained low (<20) down to the point wherein the ink composition contained a carbon black content of about 1% by weight of the ink composition. At this level of carbon black, however, the visible printed code contrast was too low to be practical. To overcome this limitation with low carbon black, one strategy was to combine carbon black with a blue-shade pigment as provided in Table 8.

TABLE 8

| Formulation components | Example 17 |
| --- | --- |
| MEK | 81.89 |
| Solsperse 38500 | 0.9 |
| MHI Black | 5.8 |
| Microlith AR3K Blue | 6.0 |
| Vinnol E15/40A | 4.5 |
| TBAPF$_6$ | 0.9 |
| Silwet L7622 | 0.01 |
| FORMULATION TOTAL | 100.0 |

Example 17 exhibited contrast that was nearly identical to Comparative Example A as is shown in Table 9. Despite its good contrast, Example 17 performed relatively poorly in the Residual Conductivity Test failing in only 13 cycles as shown in Table 10 below. The data show that a balance can be achieved between a first organic pigment and a second carbon black pigment to provide both augmented contrast with a lower total weight basis level of pigment and far reduced tendency to fail due to conductivity over carbon black alone.

TABLE 9

| | | Example | |
| --- | --- | --- | --- |
| | | Comparative Example A | Example 17 |
| Visual color | | Black | Black |
| Total pigment content | | 3.0 | 4.1 |
| First pigment | | 0.0 | 2.9 |
| Carbon black content | | 3.0 | 1.2 |
| Carbon black % as a % of total pigment | | 100.0 | 28.3 |
| Draw down contrast assessment | Optical density | 1.84 | 2.13 |
| | L* | 10.2 | 10.0 |
| | a* | 2.2 | -5.7 |
| | b* | 6.1 | -15.3 |
| | ΔE from Comparative Example A | 0.0 | 22.8 |
| | ΔL from background | -84.4 | -84.6 |
| | ΔL from Comparative Example A | 0.0 | -0.2 |

TABLE 10

| | Formula % Carbon black pigment | Visible code contrast | Approximate printhead cleaning cycles to failure, Residual Conductivity Test |
| --- | --- | --- | --- |
| Comparative example A | 3 | Good | 5 |
| Dilution 1 | 2.1 | Good | 8 |
| Dilution 2 | 1.7 | OK | 13 |
| Example 17 | 1.2 | Good | 13 |
| Dilution 3 | 1.1 | Poor | 24 |
| Dilution 4 | 0.6 | Poor | 51 |

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An ink jet ink composition comprising:
   an organic solvent;
   a resin; and
   a colorant selected from at least a first pigment and a second pigment, where neither the first pigment nor second pigment is carbon black;
   wherein if the ink composition further comprises carbon black, the carbon black is present in an amount less than 35% by weight of the total pigment content.

2. The ink composition of claim 1, wherein the ink composition is substantially free of carbon black.

3. The ink composition of claim 1, wherein the ink composition appears substantially black when printed on a white substrate.

4. The ink composition of claim 1, wherein the first pigment is selected from a dioxazine pigment.

5. The ink composition of claim 1, wherein the first pigment is selected from C.I. Pigment Violet 23, C.I. Pigment Violet 34, C.I. Pigment Violet 35, C.I. Pigment Violet 37, C.I. Pigment Blue 15:3, C.I. Pigment Blue 15:4, C.I. Pigment Blue 80, and mixtures thereof.

6. The ink composition of claim 1, wherein the first pigment is selected from a blue shade violet pigment and a blue pigment.

7. The ink composition of claim 1, wherein the first pigment is C.I. Pigment Blue 60.

8. The ink composition of claim 1, wherein the first pigment is selected from an anthraquinone pigment and a phthalocyanine pigment.

9. The ink composition of claim 1, wherein the first pigment is selected from C.I. Pigment Blue 15:3, Pigment Green 7, Pigment Blue 15:4, and mixtures thereof.

10. The ink composition of claim 1, wherein the first pigment is a perylene black pigment.

11. The ink composition of claim 1, wherein the second pigment is selected from a yellow pigment.

12. The ink composition of claim 1, wherein the second pigment is selected from a benzimidazolone pigment and an isoindolinone pigment.

13. The ink composition of claim 1, wherein the second pigment is selected from Pigment Yellow 180, Pigment Yellow 151, Pigment Yellow 155, Pigment Yellow 139, and mixtures thereof.

14. The ink composition of claim 1, wherein if only two pigments are used the first pigment is a blue shade violet or blue pigment and the second pigment is a red-shade yellow pigment or orange pigment.

15. The ink composition of claim 1, wherein if only two pigments are used the first pigment is a green pigment and the second pigment is a red pigment.

16. The ink composition of claim 1 further comprising a third pigment, wherein the first pigment is a blue shade violet or blue pigment, the second pigment is a yellow pigment and the third pigment is a red pigment or a red shade violet pigment.

17. The ink composition of claim 16 wherein the ratio of the sum of the mass of the red pigment or a red shade violet pigment plus the mass of the yellow pigment, to the mass of the blue shade violet or blue pigment, is between 1.0 and 3.5.

18. The ink composition of claim 16, wherein the red or red-shade violet pigment is a quinacridone pigment.

19. The ink composition of claim 16, wherein the red pigment is selected from Pigment Red 122, Pigment Violet 19, Pigment Red 202, and mixtures thereof.

20. The ink composition of claim 1, wherein the resin is selected from acrylic resins, vinyl resins, vinyl acetate/vinyl chloride copolymers, and mixtures thereof.

21. The ink composition of claim 1, wherein if water is present, it is present in an amount less than 1% by weight of the ink composition.

22. The ink composition of claim 1, wherein the organic solvent is selected from ketones, esters, alcohols, and mixtures thereof.

23. The ink composition of claim 1, wherein when the ink composition is applied at 0.5 mils or greater thickness to a white substrate and allowed to dry, the dried ink composition has measurable color difference from the background defined by an absolute $\Delta L^*$ from the background of at least 50 and a reflectance less than 30% for any visible light wavelength.

24. The ink composition of claim 1, wherein when the ink composition is applied to a substrate, allowed to dry, and cleaned with solvent, a location of the substrate where the dried ink composition was located has a resistance of at least 1 gigaohms when measured across any two selected points 1 cm apart on the location of the substrate, after at least 50 cleaning cycles are done.

* * * * *